United States Patent Office 3,012,972
Patented Dec. 12, 1961

3,012,972
AQUEOUS SILICA DISPERSIONS
AND THEIR PRODUCTION
Joseph M. Rule, Brandywine Hundred, Del., assignor to E. I. du Pont de Nemours and Company, Wilmington, Del., a corporation of Delaware
No Drawing. Filed Feb. 20, 1959, Ser. No. 794,532
9 Claims. (Cl. 252—313)

This invention relates to novel aqueous, amorphous silica dispersions stable against gelation and to processes for producing them, and is more particularly directed to such aqueous dispersions containing an amount of silica from above 51% to (80–0.2A)%, where A is the surface area of the silica in square meters per gram (m.$^2$/g.), the silica being present as dense, substantially spheroidal particles having a specific surface area in the range of 10 to 60 m.$^2$/g., and the sol containing an amount of alkali corresponding to an $M_2O:SiO_2$ mol ratio of less than 0.002:1, where M is a monovalent cation of the alkali; and is further directed to processes for producing the novel dispersions comprising the steps of heating a salt-free (less than 0.1N) silica sol having a pH of 3 to less than 7 and particles with a specific surface area of from above 200 to 400 m.$^2$/g. and having a total $M_2O:SiO_2$ ratio of 0.0001:1 to 0.002:1 (M preferably being Na) and having from 2 to 20% by weight of $SiO_2$ (preferably 5 to 10%), to a temperature in the range of from 160° C. to 370° C. (preferably from 275 to 350° C.) in a pressure vessel, and thereafter removing water from the product, preferably by boiling, until the $SiO_2$ weight concentration of the resulting dispersion is greater than 51%.

Recently alkali-stabilized silica aquasols have become established commodities of commerce because methods for making them, such as those of Bechtold and Snyder United States Patent 2,574,902, have become available. The concentration of such sols has ranged from 20 to 35% $SiO_2$, and 35% has generally been regarded as the practical upper limit, although in Rule United States Patent 2,577,485 it is shown that by suitable deionization of sols of the Bechtold and Snyder type, silica concentrations as high as 50% $SiO_2$ can be achieved.

The present invention is concerned with dispersions which are even more concentrated than the sols of the Rule patent. Novel dispersions with a silica content as high as 78% can readily be achieved, although all the sols and dispersions having silica concentrations greater than about 51% $SiO_2$ have unique and unexpected characteristics.

According to the present invention it has been found that by heating a salt-free silica sol of pH 3 to less than 7, containing particles having a surface area of 200 to 400 m.$^2$/g. and a total $M_2O:SiO_2$ ratio of 0.0001:1 to 0.002:1 and containing 2 to 20% silica, to a temperature of from 160 to 370° C. and thereafter removing water from the product as by boiling, stable aqueous dispersions of amorphous silica having an $SiO_2$ content of from 51% to (80–0.2A)% can be prepared. In these sols the amorphous silica is present as dense, spheroidal particles having a surface area of from 10 to 60 m.$^2$/g. The sols are alkali-stabilized but the $M_2O:SiO_2$ ratio is less than 0.002:1.

The processes of this invention start with a salt-free silica sol in which the particles of silica have a specific surface area of from 200 to 400 m.$^2$/g. By "salt-free" is meant that the salt content is less than 0.1 normal. Such a sol can be readily prepared by methods with which the art is already familiar. Thus, by removing sodium ions from sodium silicate solution and concentrating the resulting ion-exchange effluent, after stabilizing with alkali, according to the methods described in the above-mentioned Bechtold and Snyder patent, and subjecting the resultant sol to anion- and cation-exchange processes a sol of the desired type is obtained. Similarly, sols described in Rule U.S. Patents 2,577,484 and 2,577,485 can be used as starting sols.

Also useful as starting materials are the sols of U.S. Patent 2,750,345 issued June 12, 1956 to Guy B Alexander. In particular, any of the sols of Examples 1, 2, and 3 of that patent can be employed.

Irrespective of what sol is used as the starting material, the particles in the sol should have a specific surface area of from 200 to 400 m.$^2$/g. If the particles in the sol are substantially discrete spheroids, and are dense, this surface area range will correspond to particles of from 15 down to 7 millimicrons in diameter. The surface area can be determined by such well-known methods as nitrogen adsorption or calculation from direct observation of the particle diameters on electron micrographs.

The pH of the starting sol selected should be in the range of from 3 to less than 7. At a pH of 7 or above an unwanted conversion to crystalline silica will occur. If the sol is alkaline, a very satisfactory way of removing the alkali and bringing the pH into the desired range is to treat the sol with a mixture of cation-exchange resin in the hydrogen form and anion-exchange resin in the hydroxyl form until the pH has been lowered to the requisite figure. Thus, a pH in the range of 3 to, say, 6.9, is readily achieved.

It will be understood, of course, that by the method just described the amount of alkali in the silica sol can be reduced substantially to zero. However, a small proportion of alkali should still remain associated with the silica. This alkali can be permitted to remain in the sol by suitable control of the deionization procedure already described, or it can be added back to a completely deionized sol. The proportion of such alkali should be enough to give a total $M_2O:SiO_2$ mol ratio in the range of 0.0001:1 to 0.002:1, where M is an alkali metal cation such as potassium, lithium, or sodium, or a nitrogen base cation such as a quaternary ammonium or an amine cation. Particularly preferred are sols in which the alkali present is a sodium base.

The sol to be treated according to this invention should contain from 2 to 20% by weight of silica calculated as $SiO_2$. In the preferred processes the silica content is from 5 to 10% by weight. If the sol is originally in a more concentrated form it can be diluted with distilled water. The diluted sol should be clear before proceeding with the next step of the process and if necessary, should be filtered.

Having prepared a suitable sol as above-described, the next step in the process is to heat the sol under pressure to a temperature in the range of from 160° C. to 370° C., a particularly preferred temperature being from 275 to 350° C. This heating step effects a modification of the particles and, while they are not converted to the crystalline form, the heating does convert them into a condition such that in a concentrated dispersion they remain stable against gelation. The time of heating is relatively unimportant provided a sufficient time is allowed for this conversion to take place. Thus, a heating period of from 10 minutes to 50 hours can be employed, depending upon the starting sol and the degree of modification desired.

The time required to grow the particles to a given size decreases as the temperature increases. Temperatures above 275° C. require relatively short times and hence are preferred. At 350° C., a time as short as one minute can be used successfully.

After the sol has been heated, water is removed, as for example by boiling, until the concentration of the resulting dispersion is greater than 51%. The maximum silica content to which the dispersion can be concentrated is dependent upon the surface area of the particles as already mentioned, but is in any event not more than 78% $SiO_2$, since at this concentration, even particles with surface area as low as 10 m.$^2$/g. are essentially in contact with each other, and further removal of water results in complete loss of fluidity.

The art is, of course, familiar with methods for removing water from sols and any such method can be used. Atmospheric boiling is entirely satisfactory, but vacuum evaporation, or even evaporation under pressure can be used in particular instances. Alternatively, water may be removed by centrifuging to remove excess mother liquor or pressing, using a colloidal membrane barrier. In any event, the concentration step must follow the heat-growing step.

The novel compositions produced by the processes just described are stable dispersions of silica having a silica content of from 51 to (80–0.2A)%. "A" stands for the surface area of the silica particles in square meters per gram and since this is at least 10, the expression "80–0.2A" becomes 78 as the maximum silica concentration of the dispersion. It will be noted that the surface area of the dispersions can be from 10 to 60 square meters per gram and for the dispersions of highest surface area the maximum concentration is 68%. The preferred sols have a specific surface area of from 20 to 60 m.$^2$/g.

Actually, in the range of 10 to 20 m.$^2$/g., this silica particles are so large that they tend to settle. Such products are dispersions. In the range of surface areas greater than 20 m.$^2$/g., the dispersions have little tendency to settle and hence are colloidal sols. Colloidal sols are a special and preferred class of the dispersions of the present invention.

The particles in a dispersion of this invention are amorphous. They give no evidence of crystallinity when examined by such well-known methods as electron diffraction.

The particles in the dispersions are also dense. It is, of course, impossible to measure directly the density of the particles, but by comparing the surface area as calculated from electron micrographs with that calculated from the nitrogen adsorption the fact of whether or not the particles are porous can be readily ascertained. Thus, if agreement of the surface area as determined by the two methods is within 30%, it can be assumed that the particles are dense rather than porous, since porous particles would have a much lower apparent surface area by electron micrograph measurement than by nitrogen adsorption.

In considering the particle density as just mentioned, the state of aggregation of the particles is also a factor, and this can be determined by the viscosity. Highly aggregated particles would give the dispersion a high relative viscosity. Dispersions of this invention have a relative viscosity, when diluted to 10% $SiO_2$ and adjusted to pH 2 to 3, of from 1.135 to 1.55. In the preferred dispersions the relative viscosity is from 1.135 to 1.25 under the same conditions.

In more alkaline solutions, one cannot maintain the original large particles, because of the dissolution phenomena. With particles of a size corresponding to 10 m.$^2$/g. surface area this dissolution process begins to occur at an $M_2O:SiO_2$ ratio of about 0.002:1; and hence the products of this invention are limited to a ratio below this, that is, to $M_2O:SiO_2$ ratios of from 0 to 0.002:1.

In the foregoing discussion of ratios the "M" of $M_2O$ stands for a monovalent cation selected from the group consisting of alkali metals, ammonium, and hydrocarbon-substituted ammonium. The latter two cannot, of course, exist as the oxides, but the corresponding hydroxides can be calculated as the oxides. Thus, the alkali of the ratio can be, for instance, sodium hydroxide, potassium hydroxide, ammonium hydroxide, tetramethylammonium hydroxide, or tetraethylammonium hydroxide.

The silica and alkali components making up the ratio can be determined by ordinary analytical methods with which the art is already familiar. When alkalinity is determined by titration care must be taken, of course, to titrate all of the alkalinity. If the end-point of the titration is not permanent, the titration will either be continued until permanency is attained, or an amount of acid will be added in excess of that required to neutralize all of the alkalinity and the excess will be back-titrated with standard alkali.

The dispersions of this invention are further characterized by containing particles having a surprising degree of size uniformity. Preferred products can be made which contain essentially no particles of a diameter less than 10 millimicrons. In the especially preferred sols the particles are in the size range of 20 to 60 m.$^2$/g. and contain essentially no particles, i.e. less than 1% by weight, having a surface area greater than 100 m.$^2$/g. or which are smaller than 30 millimicrons as observed in the electron micrograph.

The more concentrated dispersions of this invention can have densities as high as 1.6 grams per milliliter. On account of their high densities the dispersions have utility as liquids in flotation processes.

Another interesting property of the products of this invention is that they can be dried to films. Thus, when they are dried down in thin layers they form a continuous film of close-packed silica particles which remain coherent and are adherent to the substrate. Since the dispersions consist of ultimate particles which do not readily stick together they form a more coherent film than can be obtained from sols in which the particles tend to stick together. Apparently this is due to the fact that as the film becomes almost dry, the particles which do not stick together can roll around over each other, so that the film can shrink to a dense, close-packed mass of particles as the water evaporates. On the other hand, sols of particles which readily coalesce with each other do not dry to coherent films. As the particles first come together in the initial stage of drying of the film, they tend to stick together into an open gel structure. Since the particles stick to each other tightly, the open network structure is rigid, and as the water dries out of it, the structure tends to shrink, and, being rigid, cracks apart in the phenomenon known as "crazing."

The invention will be better understood by reference to the following illustrative examples:

*Example 1*

One gallon of a silica sol, containing 30% $SiO_2$ in the form of colloidal particles which were essentially discrete spheres having an average diameter of 15 m$\mu$ as determined from an electron micrograph, and containing 0.33% by weight $Na_2O$, was deionized as completely as possible by treatment with ion-exchange resins. Thus, the sol was stirred with a mixture of "Dowex" 50 cation-exchange resin in the hydrogen form and "Amberlite" IR45 anion-exchange resin in the hydroxyl form until the pH of the sol was 3.8 and its specific resistance was 5,000 ohms.

"Dowex" 50 is an aromatic hydrocarbon polymer containing nuclear sulfonic acid groups, being further described in Journ. Am. Chem. Soc. 69, 2830 (1947).

"Amberlite" IR45 is a reaction product of (1) a halomethylated copolymer of monovinyl and divinyl aromatic hydrocarbons and (2) a primary amine—see U.S. Patent 2,591,574.

The sol was filtered, diluted with 2 parts by weight of distilled water, and placed in a stainless steel autoclave. The temperature was raised to 350° C. over a 4.5 hour period and held at this temperature for 3 hours. The sol was then cooled to room temperature over a 3 hour period.

The resulting milk-white sol contained 12% $SiO_2$ and had a pH of 9.2. It was treated with more of the "Dowex" 50 resin until the pH was reduced to 3.1. The sol was then concentrated by boiling at 75° C. under reduced pressure, using a submerged stainless steel steam coil as the source of heat. Evaporation was continued until the sol became viscous and silica began to cake on the surface of the steam coil. The sol was then drained from the evaporator and cooled to room temperature.

The product was a stable, though viscous, sol containing 69.2% $SiO_2$. The pH was 3.1, showing the complete absence of free alkali, i.e., the $M_2O:SiO_2$ ratio was 0. From an electron micrograph, the particles of the sol were shown to consist of spheroidal particles which had an average diameter of 150 m$\mu$, corresponding to a surface area of 20 m.$^2$/g.

*Example 2*

A one gallon portion of the silica sol used as the starting material in Example 1 was treated with "Dowex" 50 resin in the hydrogen form until the pH was reduced to 2.0, then with "Amberlite" IR45 resin in the hydroxyl form to increase the pH to 2.8. The sol was further treated with a mixture of these resins and finally with the anion-exchange resin alone. The pH of the sol was 3.4 and the specific resistance was 3,400 ohms.

A 3,750 gram portion of this sol was diluted with 8 liters of distilled water, heated over a period of 7 hours to 340° C., held at 340° C. for 3 hours and cooled to room temperature over a 1.5 hour period.

The milk-white sol contained 9.9% $SiO_2$, had a pH of 8.9, and an average particle diameter of 88 m$\mu$ as determined by electron micrograph.

The sol was deionized to pH 3.5 with "Dowex" 50 resin and concentrated as described in Example 1 to give a viscous but stable sol containing 62% $SiO_2$.

*Example 3*

A one gallon portion of the silica sol used as the starting material in Example 1 was deionized to pH 2.7 with "Dowex" 50 resin in the hydrogen form, filtered, deionized with "Amberlite" IR45 to pH 5.6, filtered, and deionized with a mixture of the two resins to pH 3.2. The sol was diluted with two volumes of distilled water, and heated 87 hours in a steam bath. It was then cooled, and the pH reduced from 6.8 to 3.05 by treatment with "Dowex" 50 resin. The resulting sol was heated in a stainless steel autoclave at 340° C. for 6 hours. At this point the sol contained 10.6% $SiO_2$, had a pH of 8.0, and an average particle diameter of 105 m$\mu$.

A 3,180 gram portion of this sol was concentrated by boiling at 65° C. under vacuum until 2,518 milliliters of distillate had been removed. The fluid sol obtained, containing 51% by weight $SiO_2$, was further concentrated by centrifugation, using an International Electric Centrifuge, size 1, at 2,000 r.p.m. for a total of 9 hours.

The final product was a somewhat viscous, though stable, sol containing 59% $SiO_2$ and 0.078% $Na_2O$.

This application is a continuation-in-part of my copending application Serial No. 631,391, filed December 31, 1956, for: Composition and Process, now abandoned.

I claim:

1. An aqueous silica dispersion consisting essentially of an aqueous continuous phase and a dispersed phase of dense, spheroidal amorphous silica particles having a specific surface area in the range of 10 to 60 square meters per gram, the concentration of silica in the dispersion being from above 51 to (80–0.2A) percent by weight where A is the surface area of the silica in square meters per gram, and the dispersion containing an amount of alkali corresponding to an $M_2O:SiO_2$ mol ratio of less than 0.002:1 where M is a monovalent cation of the alkali.

2. A silica aquasol stable against gelation consisting essentially of an aqueous continuous phase and a dispersed phase of dense, spheroidal amorphous silica particles having a specific surface area in the range of 20 to 60 square meters per gram, the concentration of silica in the aquasol being from above 51 to (80–0.2A) percent by weight where A is the surface area of the silica in square meters per gram, and the aquasol containing an amount of alkali corresponding to an $M_2O:SiO_2$ mol ratio of less than 0.002:1 where M is a monovalent cation of the alkali.

3. In a process for producing an aqueous dispersion of amorphous silica particles, the steps comprising heating to a temperature in the range of 160 to 370° C. an aqueous silica sol which has an electrolyte content equivalent to less than 0.1N of a salt of a monovalent cation, has a pH of from 3 to less than 7, contains an amount of alkali such that the total $M_2O:SiO_2$ mol ratio is from 0.0001:1 to 0.002:1 where M is a monovalent cation of the alkali, and contains from 2 to 20 percent by weight of silica in the form of particles having a surface area of from above 200 to 400 square meters per gram, until the specific surface area of the silica particles, A, is in the range of from 10 to 60 square meters per gram, and thereafter removing water from the dispersion until the silica concentration, as $SiO_2$, is in the range of 51 to (80–0.2A) percent by weight.

4. In a process for producing an amorphous silica aquasol the steps comprising heating to a temperature in the range of 160 to 370° C. an aqueous silica sol which has an electrolyte content equivalent to less than 0.1N of a salt of a monovalent cation, has a pH of from 3 to less than 7, contains an amount of alkali such that the total $M_2O:SiO_2$ mol ratio is from 0.0001:1 to 0.002:1 where M is a monovalent cation of the alkali, and contains from 2 to 20 percent by weight of silica in the form of particles having a surface area of from 200 to 400 square meters per gram, until the specific surface of the silica particles is in the range of from 10 to 60 square meters per gram, and thereafter removing water from the sol until the silica concentration as $SiO_2$, is greater than 51 percent by weight.

5. In a process for producing an amorphous silica aquasol the steps comprising heating to a temperature in the range of 275 to 350° C. an aqueous silica sol which has an electrolyte content equivalent to less than 0.1N of a salt of a monovalent cation, has a pH of from 3 to less than 7, contains an amount of alkali such that the total $M_2O:SiO_2$ mol ratio is from 0.0001:1 to 0.002:1 where M is a monovalent cation of the alkali, and contains from 2 to 20 percent by weight of silica in the form of particles having a surface area of from 200 to 400 square meters per gram, until the specific surface of the silica particles is in the range of from 10 to 60 square meters per gram, and thereafter removing water from the sol until the silica concentration, as $SiO_2$, is greater than 51 percent by weight.

6. In a process for producing an amorphous silica aquasol the steps comprising heating to a temperature in the range of 160 to 370° C. an aqueous silica sol which has an electrolyte content equivalent to less than 0.1N of a salt of a monovalent cation, has a pH of from 3 to less than 7, contains an amount of alkali such that the total $M_2O:SiO_2$ mol ratio is from 0.0001:1 to 0.002:1 where M is a monovalent cation of the alkali, and contains from 5 to 10 percent by weight of silica in the form of particles having a surface area of from 200 to 400 square meters per gram, until the specific surface of the silica particles is in the range of from 10 to 60 square meters per gram, and thereafter removing water from the sol until the silica concentration, as $SiO_2$, is greater than 51 percent by weight.

7. In a process for producing an amorphous silica aquasol the steps comprising heating to a temperature in the range of 275 to 350° C. an aqueous silica sol which has an electrolyte content equivalent to less than 0.1N of a salt of a monovalent cation, has a pH of from 3 to less than 7, contains an amount of alkali such that the total $M_2O:SiO_2$ mol ratio is from 0.0001:1 to 0.002:1 where M is a monovalent cation of the alkali, and contains from 5 to 10 percent by weight of silica in the form of particles having a surface area of from 200 to 400 square meters per gram, until the specific surface of the silica particles is in the range of from 10 to 60 square meters per gram, and thereafter removing water from the sol until the silica concentration, as $SiO_2$, is greater than 51 percent by weight.

8. In a process for producing an amorphous silica aquasol the steps comprising heating to a temperature in the range of 160 to 370° C. an aqueous silica sol which has an electrolyte content equivalent to less than 0.1N of a salt of a monovalent cation, has a pH of from 3 to less than 7, contains an amount of alkali such that the total $M_2O:SiO_2$ mol ratio is from 0.0001:1 to 0.002:1 where M is a monovalent cation of the alkali, and contains from 2 to 20 percent by weight of silica in the form of particles having a surface area of from 200 to 400 square meters per gram, until the specific surface of the silica particles is in the range of from 10 to 60 square meters per gram, and thereafter boiling off water from the sol until the silica concentration, as $SiO_2$, is greater than 51 percent by weight.

9. In a process for producing an amorphous silica aquasol the steps comprising heating to a temperature in the range of 160 to 370° C. an aqueous silica sol which has an electrolyte content equivalent to less than 0.1N of a salt of a monovalent cation, has a pH of from 3 to less than 7, contains an amount of a sodium base such that the total $Na_2O:SiO_2$ mol ratio is from 0.0001:1 to 0.002:1, and contains from 2 to 20 percent by weight of silica in the form of particles having a surface area of from 200 to 400 square meters per gram, until the specific surface of the silica particles is in the range of from 10 to 60 square meters per gram, and thereafter removing water from the sol until the silica concentration, as $SiO_2$, is greater than 51 percent by weight.

References Cited in the file of this patent

UNITED STATES PATENTS

| | | |
|---|---|---|
| 2,577,484 | Rule | Dec. 4, 1951 |
| 2,577,485 | Rule | Dec. 4, 1951 |
| 2,663,614 | Haag | Dec. 22, 1953 |